US012181890B2

(12) United States Patent
Ma et al.

(10) Patent No.: US 12,181,890 B2
(45) Date of Patent: Dec. 31, 2024

(54) HIGH-DEFINITION MAPPING

(71) Applicant: CYNGN, INC., Menlo Park, CA (US)

(72) Inventors: Biao Ma, Sunnyvale, CA (US); Lior Tal, San Diego, CA (US)

(73) Assignee: CYNGN, INC., Menlo Park, CA (US)

( * ) Notice: Subject to any disclaimer, the term of this patent is extended or adjusted under 35 U.S.C. 154(b) by 0 days.

(21) Appl. No.: 17/814,909

(22) Filed: Jul. 26, 2022

(65) Prior Publication Data
US 2023/0025579 A1   Jan. 26, 2023

Related U.S. Application Data

(60) Provisional application No. 63/366,738, filed on Jun. 21, 2022, provisional application No. 63/225,663, filed on Jul. 26, 2021, provisional application No. 63/225,665, filed on Jul. 26, 2021.

(51) Int. Cl.
*G05D 1/00* (2024.01)

(52) U.S. Cl.
CPC ......... *G05D 1/0274* (2013.01); *G05D 1/0212* (2013.01); *G05D 1/0248* (2013.01); *G05D 1/027* (2013.01); *G05D 1/0272* (2013.01)

(58) Field of Classification Search
CPC .. G05D 1/0274; G05D 1/0212; G05D 1/0248; G05D 1/027; G05D 1/0272
See application file for complete search history.

(56) References Cited

U.S. PATENT DOCUMENTS 6,308,134 B1 * 10/2001 Croyle ................... G01C 21/16
                                                         701/472
11,106,218 B2 * 8/2021 Levinson ............... G10K 11/26
(Continued)

FOREIGN PATENT DOCUMENTS

CN            104897161 A  *  9/2015  ........... G01C 21/165
WO   WO-2008023877 A1  *  2/2008  ............. G01C 21/32

OTHER PUBLICATIONS

English Translation of CN-104897161-A.*
(Continued)

*Primary Examiner* — Rami Khatib
*Assistant Examiner* — Shahira Baajour
(74) *Attorney, Agent, or Firm* — Maschoff Brennan

(57) ABSTRACT

A method may include obtaining sensor data about a total measurable world around an autonomous vehicle. The sensor data may be captured by sensor units co-located with the autonomous vehicle. The method may include generating a mapping dataset including the obtained sensor data and identifying data elements that each represents a point in the mapping dataset. The method may include sorting the data elements according to a structural data categorization that is a template for a high-definition map of the total measurable world and determining a mapping trajectory of the autonomous vehicle. The mapping trajectory may describe a localization and a path of motion of the autonomous vehicle. The method may include generating the high-definition map based on the structural data categorization and relative to the mapping trajectory of the autonomous vehicle, and the high-definition map may be updated based on the path of motion of the autonomous vehicle.

8 Claims, 7 Drawing Sheets

(56) References Cited

U.S. PATENT DOCUMENTS

| | | | |
|---|---|---|---|
| 2015/0051785 A1* | 2/2015 | Pal | G01P 15/18 |
| | | | 701/29.1 |
| 2015/0092989 A1* | 4/2015 | Kasaoki | G06V 20/58 |
| | | | 382/104 |
| 2016/0132745 A1* | 5/2016 | Falb | G06T 7/00 |
| | | | 348/148 |
| 2017/0242442 A1* | 8/2017 | Minster | G06T 7/38 |
| 2017/0336790 A1* | 11/2017 | Glebov | G05D 1/0088 |
| 2018/0040240 A1 | 2/2018 | Newman | |
| 2018/0350144 A1* | 12/2018 | Rathod | G06Q 20/3224 |
| 2019/0258251 A1 | 8/2019 | Ditty et al. | |
| 2019/0346271 A1 | 11/2019 | Zhang et al. | |

OTHER PUBLICATIONS

PCT International Search Report and Written Opinion issued in corresponding application No. PCT/US2022/038387, dated Feb. 7, 2023.

\* cited by examiner

HIGH-DEFINITION MAPPING

CROSS-REFERENCE TO RELATED APPLICATIONS

This application claims the benefit of U.S. Patent Application Ser. No. 63/225,663, filed on Jul. 26, 2021, U.S. Patent Application Ser. No. 63/225,665, filed on Jul. 26, 2021, and U.S. Patent Application Ser. No. 63/366,738, filed on Jun. 21, 2022; the disclosures of which are incorporated herein by reference in their entireties.

FIELD OF THE INVENTION

The present disclosure generally relates to a system and method of high-definition mapping.

BACKGROUND

An autonomous vehicle may scan an environment in which the autonomous vehicle is located using one or more sensors positioned on and/or around the autonomous vehicle. The autonomous vehicle may detect objects based on data collected by the sensors and avoid objects in a path of travel of the autonomous vehicle based on the detected objects.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include a method that may include obtaining sensor data about a total measurable world around an autonomous vehicle. The sensor data may be captured by sensor units co-located with the autonomous vehicle. The method may include generating a mapping dataset including the obtained sensor data and identifying data elements that each represents a point in the mapping dataset. The method may include sorting the data elements according to a structural data categorization that is a template for a high-definition map of the total measurable world and determining a mapping trajectory of the autonomous vehicle. The mapping trajectory may describe a localization and a path of motion of the autonomous vehicle. The method may include generating the high-definition map based on the structural data categorization and relative to the mapping trajectory of the autonomous vehicle, and the high-definition map may be updated based on the path of motion of the autonomous vehicle.

In some embodiments, the sensor data may include first sensor data captured at a first frequency by a first sensor type and second sensor data captured at a second frequency by a second sensor type, the second frequency being different from the first frequency. In these and other embodiments, the first sensor type may be a Light Detection And Ranging (LiDAR) sensor type that is configured to capture the first sensor data at a frequency between 30 Hertz (Hz) and 100 Hz, and the second sensor type is an inertial measurement unit (IMU) sensor type that is configured to capture the second sensor data at a frequency between 5 Hz and 20 Hz. Generating the mapping dataset may include generating a frequency-agnostic representation that combines the first sensor data and the second sensor data at a third frequency.

In some embodiments, sorting each data element of the plurality of data elements according to the structural data categorization may include categorizing the data elements in a first structural data category or a second structural data category, the first structural data category and the second structural data category each representing one or more continuous groupings of the data elements. The first structural data category and the second structural data category may relate to at least one of: intensity values of the data elements, proximity between data elements points, degree of changes to the data elements between two or more scans of the total measurable world, and color values of the data elements. In these and other embodiments, the first structural data category may include surface features representing surfaces of objects in the total measurable world, and the second structural data category may include edge features representing edges of the objects in the total measurable world.

One or more embodiments of the present disclosure may include a method that may include obtaining input information that describes an autonomous vehicle in which the input information includes two or more data types, wherein each of the two or more data types of the input information is asynchronous. The method may include aligning the input information to a consistent point in time and determining odometry information indicating a state of the autonomous vehicle at the point in time based on the aligned input information. The method may include sending the odometry information describing the autonomous vehicle to a downstream system.

In some embodiments, the state of the autonomous vehicle may describe at least one of: a position within a coordinate space, an acceleration, a velocity, an orientation, a pose, and a twist of the autonomous vehicle.

In some embodiments, the input information may include a first data type corresponding to a first sensor that captures sensor data at a first frequency and a second data type corresponding to a second sensor of a different sensor type from the first sensor that captures sensor data at a second frequency different from the first frequency. The first sensor and the second sensor may each include at least one of: a Light Detection And Ranging (LiDAR) sensor, a Global Positioning System (GPS) sensor, a wheel odometry sensor, a radar sensor, and a motion sensor configured to capture Inertial Measurement Unit (IMU) data. In these and other embodiments, the first sensor may be a Light Detection And Ranging (LiDAR) sensor that captures LiDAR data at the first frequency between 5 Hertz (Hz) and 20 Hz, and the second sensor may be a motion sensor that captures Inertial Measurement Unit (IMU) data at the second frequency between 40 Hz and 100 Hz. In these and other embodiments, determining the odometry information describing the autonomous vehicle may include determining an intermediate state of the autonomous vehicle, and the determining the intermediate state may include setting a first state of the autonomous vehicle based on recently obtained sensor data from the first sensor and the second sensor. A second state of the autonomous vehicle may be estimated based on the IMU data captured by the second sensor before capturing of additional LiDAR data by the first sensor in which the second state corresponds to the intermediate state of the autonomous vehicle. Whether the second state is within a threshold of expected variance from the first state may be verified based on the IMU data. In some embodiments, determining the intermediate state of the autonomous vehicle may further comprise updating the intermediate state based on the additional LiDAR data captured by the first sensor.

One or more embodiments of the present disclosure may include an autonomous vehicle system that is configured to perform driving operations. The autonomous vehicle system may include one or more processors, one or more sensor units configured to capture sensor data relating to a total measurable world around the autonomous vehicle system, and one or more non-transitory computer-readable storage media configured to store instructions that, in response to being executed, cause the autonomous vehicle system to perform operations. The operations may include obtaining the sensor data about the total measurable world around the autonomous vehicle system, the sensor data being captured by the one or more sensor units co-located with the autonomous vehicle system. The operations may include generating a mapping dataset including the obtained sensor data, and identifying a plurality of data elements in which each data element of the plurality represents a point in the mapping dataset. The operations may include sorting each data element of the plurality according to a structural data categorization that is a template for a high-definition map of the total measurable world around the autonomous vehicle. The operations may include determining a mapping trajectory of the autonomous vehicle that describes a localization and a path of motion of the autonomous vehicle system. The operations may include generating the high-definition map based on the structural data categorization and relative to the mapping trajectory of the autonomous vehicle system and updating the high-definition map based on the path of motion of the autonomous vehicle system.

In some embodiments, the operations may further include applying a dual-channel extended Kalman filter to the obtained sensor data to align the obtained sensor data, determining odometry information describing the autonomous vehicle system based on the aligned sensor data, and sending the odometry information indicating a state of the autonomous vehicle system to a downstream computer system associated with the autonomous vehicle system. In these and other embodiments, the obtained sensor data may include a first data type corresponding to a first sensor that captures sensor data at a first frequency, the first sensor being a Light Detection And Ranging (LiDAR) sensor that captures LiDAR data at the first frequency between 5 Hertz (Hz) and 20 Hz, and a second data type corresponding to a second sensor of a different sensor type from the first sensor that captures sensor data at a second frequency, the second sensor being a motion sensor that captures Inertial Measurement Unit (IMU) data at the second frequency between 40 Hz and 100 Hz. In these and other embodiments, determining the odometry information describing the autonomous vehicle system may include determining an intermediate state of the autonomous vehicle system in which the determining the intermediate state includes setting a first state of the autonomous vehicle system based on recently obtained sensor data from the first sensor and the second sensor. The determining the intermediate state may include estimating a second state of the autonomous vehicle system based on the IMU data captured by the second sensor before the capturing of additional LiDAR data by the first sensor, the second state corresponding to the intermediate state of the autonomous vehicle system. The determining the intermediate state may include verifying whether the second state is within a threshold of expected variance from the first state based on the IMU data and updating the intermediate state based on the additional LiDAR data captured by the first sensor.

In some embodiments, sorting each data element of the plurality according to the structural data categorization may include categorizing the data elements in a first structural data category or a second structural data category, the first structural data category and the second structural data category each representing one or more continuous groupings of the data elements. In these and other embodiments, the first structural data category may include surface features representing surfaces of objects in the total measurable world, and the second structural data category may include edge features representing edges of the objects in the total measurable world.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Figure 1:
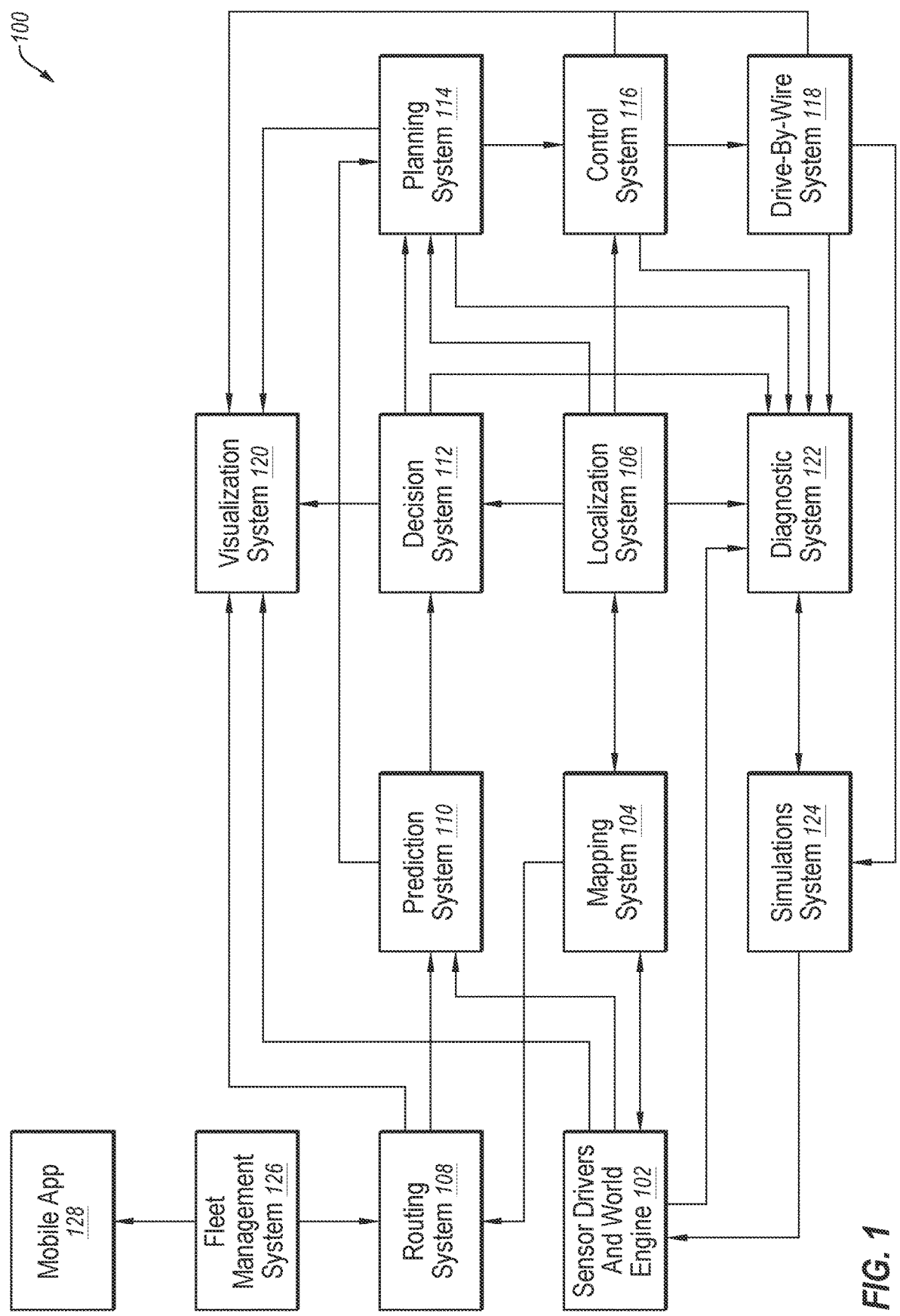
FIG. 1 illustrates an example embodiment of an autonomous driving system according to at least one embodiment of the present disclosure.

An autonomous vehicle may perform driving operations to navigate the environment in which the autonomous vehicle is operating. The autonomous vehicle may rely on a map of the environment to dictate how the autonomous vehicle should perform one or more of the driving operations. Unlike a traditional cartographic map, the map used by the autonomous vehicle to guide its driving operations may be a high-definition map that involves more detailed features of the surrounding environment because the driving operations may involve navigating one or more of these features located in the environment. As such, cartographic maps may or may not be relied on by the autonomous vehicle because such maps may not be sufficiently detailed for conducting safe and effective driving operations. However, more nuanced maps of the environment may or may not be available for the autonomous vehicle.

In some situations, the autonomous vehicle or an auxiliary mapping system may be configured to generate the map of the environment in which the autonomous vehicle operates.

The autonomous vehicle and/or the auxiliary mapping system may, for example, capture data via one or more sensors associated with the autonomous vehicle and/or the auxiliary mapping system and make a representation of the environment using the captured sensor data. However, the generated map may or may not be a high-definition map that enables the autonomous vehicle to make safe and/or effective driving decisions. A high-definition map as described in relation to the present disclosure may include correct meaning such that features in the vicinity of the autonomous vehicle are represented accurately in relation to the localization of the autonomous vehicle. Additionally or alternatively, the high-definition map may include complete context such that the entire environment in an operating range of the autonomous vehicle as defined by a user and/or an operating system is represented in the high-definition map. Additionally or alternatively, the high-definition map may include consistency between sensor scans such that the high-definition map may be used for a given period of time without the need to regenerate the high-definition map.

The present disclosure relates to a system and method of generating a high-definition map for navigation of an autonomous vehicle in which the high-definition map may include correct meaning, complete context, and/or consistency between sensor scans. The high-definition map generated according to the present disclosure may facilitate high-resolution adaptive odometry based on different types of sensor data, such as LiDAR data, image data, radar data, etc. Navigation of the autonomous vehicle, such as by odometry (e.g., use of sensor data or other information to estimate position), may benefit from accurate and fast generation of the high-definition map. Both inaccurate position estimation and inefficient position estimation of the autonomous vehicle and/or objects included in the vicinity of the autonomous vehicle may cause the autonomous vehicle to move slowly and/or increase the risk of collisions with the surrounding objects, such as road barriers, pedestrians, trees, other vehicles, etc.

One aspect of odometry includes locating the autonomous vehicle within a known space (e.g., within a map). Such a map may be a pre-existing map, or the autonomous vehicle may be traveling in a location without a known map. In these and other circumstances, the autonomous vehicle may generate and/or implement the high-definition map according to one or more embodiments of the present disclosure, and the high-definition map may be used by the autonomous vehicle for navigation during the current travel and/or in future travel through a particular region displayed by the high-definition map.

Additionally or alternatively, the present disclosure relates to a system and method of estimating a state of a system (e.g., an autonomous vehicle) based on asynchronous input information. Determining the state of the system may be facilitated by estimating a position and/or changes in the position of the system via odometry. Odometry (e.g., use of sensor data or other information to estimate position), such as for autonomous vehicles, may benefit from both accurate and fast estimation of the position of a given system (e.g., the autonomous vehicle). Both inaccurate position estimation and inefficient position estimation may cause the autonomous vehicle to move slowly and/or increase the risk of collisions with objects included in the surrounding environment, such as road barriers, pedestrians, trees, other vehicles, etc.

Embodiments of the present disclosure will be explained with reference to the accompanying drawings.

FIG. 1 illustrates an example embodiment of an autonomous driving system 100 according to at least one embodiment of the present disclosure. The autonomous driving system 100 may include one or more computer systems and/or software modules configured to perform one or more operations involved with driving an autonomous vehicle. Various aspects of the autonomous driving system 100 may be included on-board with the autonomous vehicle itself, or with a remote system in communication with the autonomous vehicle, such as a cloud computing system, a server, or a mobile device. In some embodiments, the autonomous driving system 100 may include sensor drivers and a world engine 102 that is configured to capture and process sensor data relating to an environment in which the autonomous vehicle travels, such as information relating to what objects are present in the environment and where such objects are located relative to the autonomous vehicle. The sensor data related to the autonomous vehicle's environment may be sent to a mapping system 104 to generate a virtual map of the environment. In some embodiments, the virtual map may be sent from the mapping system 104 back to the sensor drivers and world engine 102 to provide a map on which the sensor data relating to environmental objects may be oriented. Additionally or alternatively, the virtual map may provide a map onto which environmental topography may be plotted.

The virtual map of the mapping system 104 may be sent to a localization system 106 and/or a routing system 108. The localization system 106 may provide an estimated location of the autonomous vehicle within the environment and/or the virtual map, and the routing system 108 may compute a route between the estimated location of the autonomous vehicle to a designated destination along a valid path included in the virtual map.

In some embodiments, the sensor data of the sensor drivers and world engine 102 may be sent to a prediction system 110 that is configured to predict movement and/or trajectories of one or more objects in the vicinity of the autonomous vehicle and/or the autonomous vehicle itself. A decision system 112 may obtain the predicted object trajectories from the prediction system 110, and based on a location of the autonomous vehicle as determined by the localization system 106, the decision system 112 may determine one or more driving decisions according to various driving rules. The driving decisions determined by the decision system 112 may be sent to a planning system 114 that processes, parses, and/or queues the driving decisions for a downstream control system 116. In some embodiments, the control system 116 may generate control signals that are obtained by a drive-by-wire system 118 or another actuation system that controls one or more operations of the autonomous vehicle.

In some embodiments, the autonomous driving system 100 may include a visualization system 120 that is configured to obtain information from the sensor drivers and world engine 102, the prediction system 110, the decision system 112, the planning system 114, the control system 116, the drive-by-wire system 118, or any other computer system of the autonomous driving system 100. The visualization system 120 may generate two-dimensional and/or three-dimensional models of the autonomous vehicle, objects in the vicinity of the autonomous vehicle, and/or the environment in which the autonomous vehicle operates. Additionally or alternatively, the visualization system 120 may provide a visual representation of movement and/or predicted trajectories of the autonomous vehicle and/or any of the nearby objects.

In some embodiments, the autonomous driving system 100 may include a diagnostics system 122 that is configured to obtain information from the sensor drivers and world engine 102, the prediction system 110, the decision system 112, the planning system 114, the control system 116, the drive-by-wire system 118, or any other computer system of the autonomous driving system 100. The diagnostics system 122 may run diagnostic tests to assess the accuracy and/or validity of determinations and decisions made by other computer systems of the autonomous driving system 100.

In these and other embodiments, the diagnostics system 122 may be communicatively coupled to a simulations system 124 that provides a virtual environment in which the determinations and decisions made by other computer systems and/or software modules of the autonomous driving system 100 may be simulated to identify any issues with the simulated determinations and decisions. Additionally or alternatively, the simulations system 124 may obtain information from the drive-by-wire system 118 so that the simulations system 124 may run simulations based on control signals implemented by the autonomous vehicle in the real world. The simulations system 124 may virtually determine movements of the autonomous vehicle and/or of one or more objects in the vicinity of the autonomous vehicle. Based on the virtually determined movements, the simulations system 124 may determine updated positions of the autonomous vehicle and/or of the surrounding objects. In some embodiments, the simulations system 124 may provide the virtually determined movements and/or the updated positions to the sensor drivers and world engine 102 so that the total measurable world as represented by the sensor drivers and world engine 102 may be updated based on the simulation results.

In some embodiments, the autonomous driving system 100 may include a fleet management system 126 that obtains information from multiple autonomous vehicles communicatively coupled to the fleet management system 126. The fleet management system 126 may relay information between different autonomous vehicles in communication with the fleet management system 126 to coordinate operations of the multiple autonomous vehicles. In these and other embodiments, a user managing fleet operations may use a mobile app 128 to receive information from and/or send information or commands to a fleet of autonomous vehicles.

Modifications, additions, or omissions may be made to the autonomous driving system 100 without departing from the scope of the present disclosure. For example, the designations of different elements in the manner described is meant to help explain concepts described herein and is not limiting. For instance, in some embodiments, the sensor drivers and world engine 102, the mapping system 104, the localization system 106, the routing system 108, the prediction system 110, the decision system 112, the planning system 114, the control system 116, the drive-by-wire system 118, the visualization system 120, the diagnostics system 122, the simulations system 124, the fleet management system 126, and the mobile app 128 are delineated in the specific manner described to help with explaining concepts described herein but such delineation is not meant to be limiting. Further, the autonomous driving system 100 may include any number of other elements or may be implemented within other systems or contexts than those described.

Figure 2:
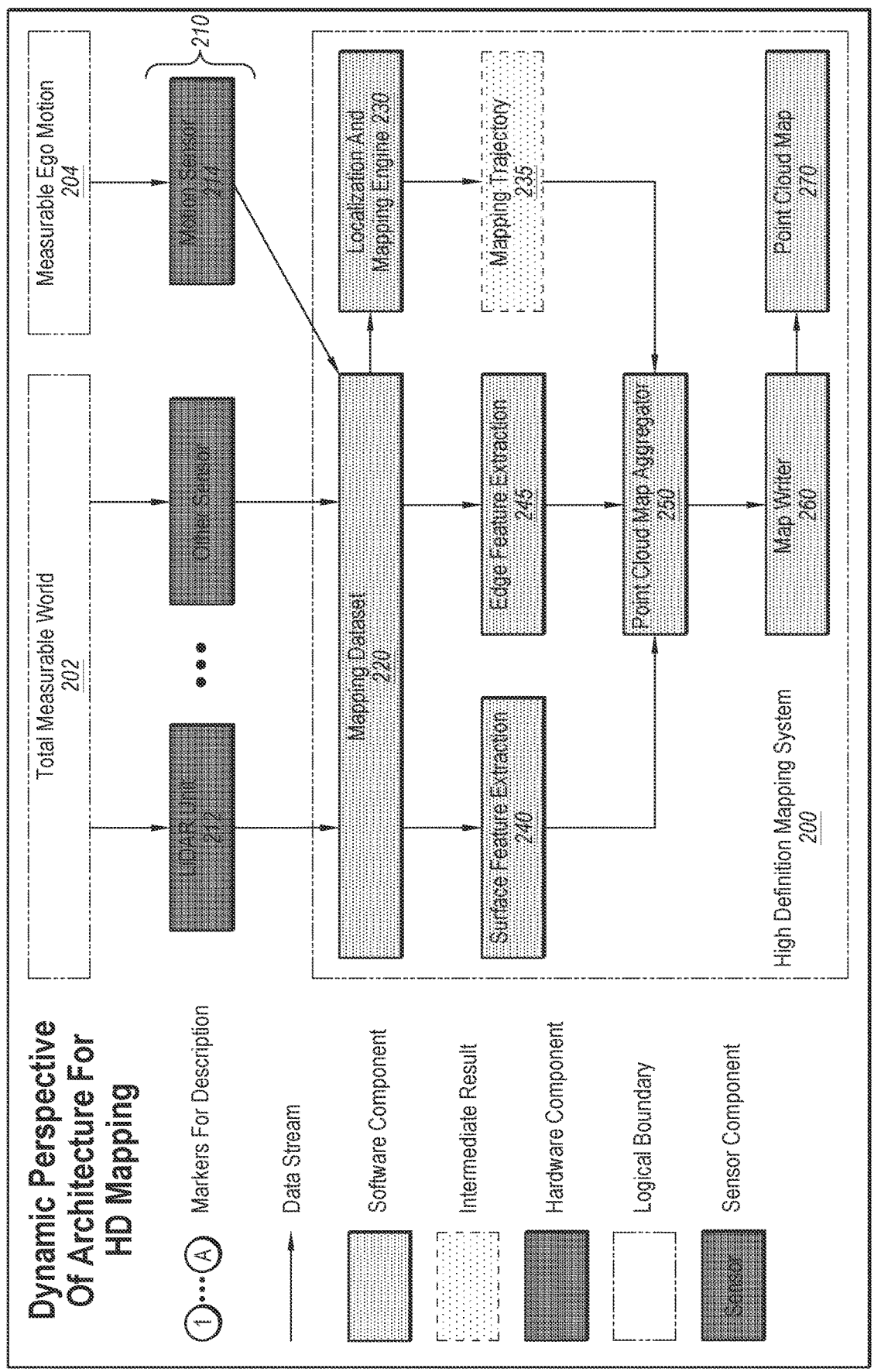
FIG. 2 illustrates an example system of generating and implementing a high-definition feature map according at least one embodiment of the to the present disclosure.

FIG. 2 illustrates an example high-definition mapping system 200 configured to generate and implement a high-definition feature map according to the present disclosure. The high-definition mapping system 200 may obtain sensor data 210 describing a total measurable world 202 around an autonomous vehicle. Examples of the sensor data 210 include LiDAR data 212, radar data, image data, GPS data, among others. Additionally or alternatively, the high-definition mapping system 200 may obtain motion data 214 describing measurable ego motion 204 of the autonomous vehicle (e.g., IMU data) from one or more sensors. The high-definition mapping system 200 may include a mapping dataset 220 from which one or more features may be extracted. For example, one or more surface features and/or edge features may be identified in and extracted from the mapping dataset 220. Additionally or alternatively, the mapping dataset 220 may be sent to a localization and mapping engine 230 to determine a mapping trajectory 235 of the autonomous vehicle for which sensor data 210 corresponding to the mapping dataset 220 is captured. The extracted features and the mapping trajectory 235 may be aggregated, such as by a point cloud map aggregator 250, and formatted, such as by a map writer 260, and a point cloud map 270 may be generated based on the surface features, the edge features, and/or the mapping trajectory 235. One or more point cloud maps 270 may be considered or combined to be considered a high-definition feature map of the total measurable world 202 around the autonomous vehicle.

The autonomous vehicle may include various sensors 210, such as one or more LiDAR sensors 212, motion sensors (e.g., an inertial measurement unit or IMU) 214, radar sensors, odometry sensors, some combination thereof, or any other sensors that are configured to capture information about the autonomous vehicle or of the total measurable world 202 around the autonomous vehicle. As described in relation to the high-definition mapping system 200, the sensors 210 may be referred to in relation to the sensor devices themselves or in reference to the data captured by the sensor devices. For example, the sensors 210 and the sensor data 210 may be referenced together. As additional or alternative examples, LiDAR data 212 may be described interchangeably with the LiDAR sensors 212, and motion data 214 may be described interchangeably with the motion sensors 214.

In some embodiments, the sensor data 210 included in the mapping dataset 220 may include information describing physical properties of one or more objects included in the total measurable world 202 and/or a motion of the autonomous vehicle. For example, the sensor data 210 included in the mapping dataset 220 may include LiDAR data 212 that describes a distance to one or more points from the perspective of the autonomous vehicle in addition to the intensity of the reflected light in a series of points in a point cloud. In these and other embodiments, the points in the point cloud may or may not correspond to a given object. In these and other examples, the LiDAR data 212 may be used to determine a shape, one or more surface properties, a thickness, and/or any other geometric property of the given object based on the distances to each of the points and corresponding return signal intensities. As another example, the mapping dataset 220 may include motion data 214, such as IMU data 214, that describes movement of the autonomous vehicle within the total measurable world 202. As another example, the mapping dataset 220 may include both LiDAR data 212 and IMU data 214 such that the data included in the mapping dataset 220 describes movement of the autonomous vehicle relative to one or more objects based on changes in the distance between the autonomous vehicle and each of the detected points over time.

The mapping dataset 220 may include the sensor data 210, which may be captured by different sensors at different frequencies of data capture. For example, the LiDAR sensor data 212 may be captured at a first frequency of 5 Hertz (Hz), 10 Hz, 15 Hz, 20 Hz, or at any other frequency, and the motion sensor data 214 may be captured at a second frequency of 40 Hz, 50 Hz, 60 Hz, 70 Hz, 80 Hz, 90 Hz, 100 Hz, or at any other frequency. In some embodiments, the mapping dataset 220 may be generated as a frequency-agnostic representation of the obtained sensor data 210 in which the mapping dataset 220 embodies a single frequency-agnostic representation of the sensor data 210 by combining the sensor data 210 at a given frequency (e.g., 50 Hz, 60 Hz, 70 Hz, 80 Hz, 90 Hz, 100 Hz, or at any other frequency) by combining the information provided by the sensor data 210 having different frequencies of data capture. For example, the mapping dataset 220 may present obtained sensor data at a representative frequency of 30 Hz by synthesizing first sensor data captured by a first sensor at 50 Hz and second sensor data captured by a second sensor at 10 Hz. In these and other embodiments, the combination may include a numerical combination of the higher frequency data (e.g., average, weighted average, etc.) such that there are an equivalent number of data points in the lower frequency data captured sensors as the higher-frequency data captured sensors. Additionally or alternatively, the combination may include all of the sensor data for both the higher frequency data capture and the lower frequency data capture sensors.

The mapping dataset 220 may be used to generate a high-definition map of the total measurable world 202 around the autonomous vehicle according to a structural data categorization of multiple data elements that make up the mapping dataset 220. The data elements may be granular points included in the mapping dataset 220 in which a total collection of the data elements represents the total measurable world 202, and the structural data categorization may represent a template from which the high-definition map of the total measurable world 202 may be generated. In a situation in which the mapping dataset 220 only includes LiDAR sensor data, for example, the LiDAR points may represent the data elements, and the LiDAR points may be sorted according to properties of the LiDAR points to form the structural data categorization. In these and other situations, the structural data categorization may include categorizing the LiDAR points according to intensities of the LiDAR points, groupings that include clusters of LiDAR points based on proximity between the LiDAR points, degree of changes to the LiDAR points between two or more scans of the total measurable world 202, or some combination thereof.

As an additional or alternative example, a mapping dataset 220 that only includes image data may be made of various pixels (that are the data elements of the mapping dataset 220 in this example) in which each pixel includes a color value representative of the color at the corresponding point in the total measurable world 202. By way of example, the structural data categorization may be set according to first pixels that include red-green-blue (RGB) values that correspond to green colors, second pixels that include RGB values that correspond to blue colors, and third pixels that include RGB values that do not correspond to green or blue. In these and other examples, the structural data categorization may be set as described above because the autonomous vehicle is configured to travel through grassy terrains in which the ground is largely represented by pixels having green colors, while the sky is largely represented by pixels having blue colors. The structural data categorization may provide information regarding where the ground and the sky are located relative to the autonomous vehicle based on the presence of first pixels having green colors and second pixels having blue colors, respectively, while the pixels not having green colors or blue colors may generally represent objects in the vicinity of the autonomous vehicle.

Organizing the mapping dataset 220 according to a structural data categorization made of the individual data elements may result in data elements included in the same categorization including one or more continuous groupings of data elements. Such continuous groupings facilitate identifying incremental connectivity and overlap of data elements between scans of the total measurable world 202, and consequently, continuity of a high-definition map. For example, a given data element positioned to be interposed between multiple other data elements may be more distinctly and/or more accurately identified through a series of scans based on these continuous groupings formed via the structural data categorization. Because each scan of the total measurable world 202 by the autonomous vehicle may only capture a subsection of the total measurable world 202 relative to a section of the total measurable world 202 of interest for the high-definition map, improving continuity between scans may facilitate generation of more detailed and/or more accurate maps. Additionally or alternatively, organizing the mapping dataset 220 using a structural data categorization may facilitate resolving occlusion, such as object ambiguity, data element blind spots, or some combination thereof, within a given scan or between scans of the total measurable world 202 because the continuity between two or more scans of the total measurable world 202 may solve ambiguities in the mapping dataset 220 that contribute to the occlusion issues.

In some embodiments, the mapping dataset 220 may be obtained by one or more feature extraction modules to facilitate extraction of features from the mapping dataset 220, such as a surface-feature extraction module 240 and/or an edge-feature extraction module 245. The surface-feature extraction module 240 and the edge-feature extraction module 245 may be configured to analyze and/or otherwise organize the mapping dataset 220 according to a structural data categorization that includes first data elements categorized as surface features and second data elements categorized as edge features.

The surface-feature extraction module 240, the edge-feature extraction module 245, and/or any other computing modules (collectively "modules") may include code and routines configured to enable a computing system to perform one or more operations. The modules may be implemented using hardware including a processor, a microprocessor (e.g., to perform or control performance of one or more operations), a field-programmable gate array (FPGA), or an application-specific integrated circuit (ASIC). In some other instances, the modules may be implemented using a combination of hardware and software. In the present disclosure, operations described as being performed by the modules may include operations that the modules may direct a corresponding system to perform. The modules may be configured to perform a series of operations with respect to the high-definition mapping system 200 and/or information obtained by the high-definition mapping system 200.

In some embodiments, the surface-feature extraction module 240 and/or the edge-feature extraction module 245 may be configured to identify one or more surface features and/or edge features included in the mapping dataset 220, respectively. For example, the surface-feature extraction module 240 may analyze a concentration and/or the intensities of the LiDAR sensor data 212 to identify one or more surface features represented by the LiDAR sensor data 212 by identifying a series of points in a point cloud at a consistent distance from the autonomous vehicle. As another example, the edge-feature extraction module 245 may analyze the concentration and/or the intensities of the sensor data 210 to identify edge features represented by the sensor data 210 by detecting a sharp change in intensity (e.g., distance from the autonomous vehicle) of points in the point cloud along a continuous line (whether curved or straight). In some embodiments, the identification of surfaces and/or edges may facilitate the identification and localization of objects. The extracted surface features and/or edge features may be aggregated (e.g., by a point cloud aggregator 250 as described below), and one or more objects may be identified based on patterns in the distances between and/or concentrations of surface features and/or edge features.

In some embodiments, the localization and mapping engine 230 may be configured to generate a mapping trajectory 235 that describes movement of the autonomous vehicle in an area represented by the mapping dataset 220 to facilitate continuously updating both the localization and the generation of the point cloud map 270. In some embodiments, the mapping trajectory 235 may facilitate generating a high-definition map including the surface features and/or the edge features identified by the surface-feature extraction module 240 and/or the edge-feature extraction module 245, respectively. The mapping trajectory 235 may describe an orientation, location, and/or path of motion of the autonomous vehicle, and the localization and mapping engine 230 may update the localization of the autonomous vehicle based on the motion of the autonomous vehicle and the location of the autonomous vehicle relative to the positions of one or more of the surface features and/or the edge features. Based on the changes in the location and/or motion of the autonomous vehicle as determined by the continuous updates of the mapping trajectory 235, different surface features and/or edge features may be identified based on sensor data 210 obtained from changes in the total measurable world 202 around the autonomous vehicle. As such, different regions of the high-definition map may be generated according to the localization and motion path of the autonomous vehicle.

In some embodiments, the point cloud map aggregator 250 may obtain one or more of the features identified by the surface-feature extraction module 240 and/or the edge-feature extraction module 245 to generate a point cloud map 270 that represents the total measurable world 202 around the autonomous vehicle. Aggregation of the features may facilitate identification of one or more objects based on patterns in the positioning and/or densities of surface features and/or edge features. For example, a cluster of surface features interposed between two or more edge features may be identified as a single object. As another example, an area between two or more edge features that includes few or no surface features may not be identified as an object. In these and other embodiments, the point cloud map aggregator 250 may or may not include other aspects such as relative intensities and/or patterns of intensity of returned LiDAR data 212 from a given perspective of the autonomous vehicle.

Additionally or alternatively, the point cloud map aggregator 250 may obtain the mapping trajectory 235 generated by the localization and mapping engine 230 to simulate movement of the autonomous vehicle within the total measurable world 202 represented by the point cloud map 270. In these and other embodiments, the movement of the autonomous vehicle within the total measurable world 202 may be represented in the point cloud map 270 by corresponding changes in the orientation and/or locations of the objects identified based on the surface features, edge features, and/or any other features relative to the orientation and/or location of the autonomous vehicle. As such, a series of point cloud maps 270 may be generated by the point cloud map aggregator 250 in which each point cloud map 270 of the series represents the total measurable world 202 at different points in time in the movement path of the autonomous vehicle.

The map writer 260 may be configured to obtain the point cloud maps 270 generated by the point cloud map aggregator 250 and format the point cloud maps 270. In some embodiments, formatting the point cloud maps 270 may include converting the point cloud maps 270 into a format capable of being queried by one or more downstream computing subsystems of the autonomous vehicle. Additionally or alternatively, the map writer 260 may be configured to optimize the format of the point cloud maps 270 to optimize downstream operations (e.g., querying and/or searching the point cloud map 270) that involve the point cloud maps 270.

In some embodiments, converting the point cloud maps 270 into a format capable of being queried may include converting the point cloud maps 270 into a data-efficient format. For example, a portion of the point cloud maps 270 may be designated as reference points, and point cloud maps 270 representing movement of the autonomous vehicle between two given reference points may be generated based on a series of snapshots of the delta (e.g., the change in the various features of the point cloud map 270) between the two given reference points. In these and other embodiments, any particular point cloud map 270 may be recreated by extrapolating forwards and/or backwards from one or more of the reference points and using the snapshots of the deltas until the particular point cloud map 270 is recalled/recreated.

When generating the map, the reference points may be designated according to a predetermined time interval (e.g., every one second, two seconds, etc.) and/or a frame interval (e.g., every three, four, five, etc. point cloud maps). Additionally or alternatively, the reference points may be designated based on identifying significant changes in the movement of the autonomous vehicle (e.g., sudden accelerations, stopping for a period of time, turning motions, etc.). Additionally or alternatively, the reference points may be designated by a user and/or by a machine-learning process. In these and other examples, generation of the point cloud maps 270 between the two given reference points may be facilitated by predicting one or more movements of the autonomous vehicle (e.g., based on the mapping trajectory 235 determined by the localization and mapping engine 230). In these and other examples, the prediction of the movements of the autonomous vehicle may be determined based on mathematical optimization algorithms.

In some embodiments, the high-definition map may be used for localization. For example, a similar set of objects (e.g., combination of edges and/or surfaces), patterns of variations in intensity, etc. may be identified as similar and/or identical to that being perceived by an autonomous vehicle and the autonomous vehicle may identify that pattern as corresponding to the specific location within the high-definition map.

Modifications, additions, or omissions may be made to the high-definition mapping system 200 without departing from the scope of the present disclosure. For example, the designations of different elements in the manner described is meant to help explain concepts described herein and is not limiting. For instance, in some embodiments, the mapping dataset 220, the surface features, the edge features, the mapping trajectory 235, and/or the point cloud map 270 are delineated in the specific manner described to help with explaining concepts described herein but such delineation is not meant to be limiting. Further, the high-definition mapping system 200 may include any number of other elements or may be implemented within other systems or contexts than those described.

Figure 3:
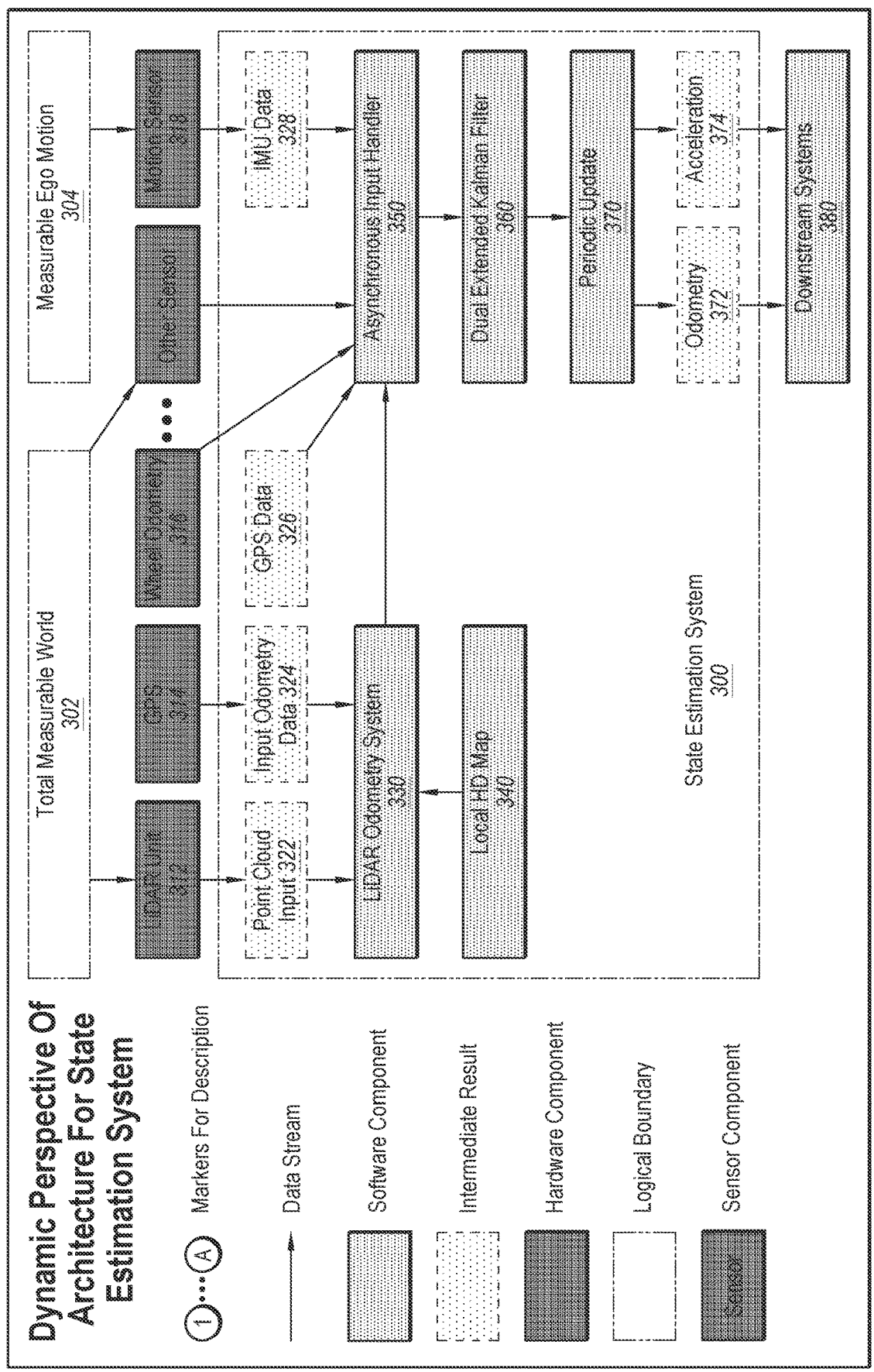
FIG. 3 illustrates an example state estimation system according at least one embodiment of the to the present disclosure.

FIG. 3 illustrates an example state estimator system 300 according to at least one embodiment of the present disclosure. In some embodiments, the state estimator system 300 may be configured to obtain information describing a system, such as an autonomous vehicle, and determine a state of the system with respect to a total measurable world 302. As used herein, the term "state" may refer to a physical state of an object or system, such as its position within a coordinate space, an acceleration, a velocity, an orientation, a pose, a twist, or some combination thereof. For example, the information obtained by the state estimator system 300 may include input point clouds 322 based on sensor readings from obtained from a LiDAR sensor unit 312 and/or input odometry data 324 that describe an initial pose seed based on information provided by a global positioning system (GPS) unit 314, a wheel odometry sensor unit 316, or some combination thereof. Additionally or alternatively, motion data 328 (inertial measurement units or IMU data), wheel odometry data, and/or GPS data related to the system obtained from a motion sensor unit 318, the wheel odometry sensor unit 316, and/or the GPS unit 314, respectively, may be considered. In these and other examples, the sensor data may represent the total measurable world 302 in which the autonomous vehicle operates and/or measurable ego motion 304 corresponding to the autonomous vehicle.

In some circumstances, the information obtained by the state estimator system 300 may be asynchronous, such as that to be processed by an asynchronous input handler 350. For example, different types of information may describe the system at different points in times, be generated at different rates, and/or be presented in different data formats to the state estimator system. In these and other examples, the information obtained by the state estimator system 300 be obtained directly from the sensor, like the wheel odometry data and the IMU data 328, and/or received from an upstream computing subsystem, such as the input point clouds 322 and the input odometry data 324 that are first sent to the LiDAR odometry system 330, which may process and fuse the input point clouds 322 and the input odometry data 324, before being sent to an asynchronous input handler 350. Additionally or alternatively, the LiDAR odometry system 330 may receive information regarding a local high-definition map 340 that includes traffic road parameters, building locations, among other information. For example, the local high-definition map 340 may indicate a length or a width of a given traffic road and/or a shape of the given traffic road to provide context for the input point clouds 322 and the input odometry data 324 of the autonomous vehicle.

In some embodiments, the state estimator system 300 may include the asynchronous input handler 350. The asynchronous input handler 350 may include code and routines configured to enable a computing system to perform one or more operations. The asynchronous input handler 350 may be implemented using hardware including a processor, a microprocessor (e.g., to perform or control performance of one or more operations), a field-programmable gate array (FPGA), or an application-specific integrated circuit (ASIC). In some other instances, the asynchronous input handler 350 may be implemented using a combination of hardware and software. In the present disclosure, operations described as being performed by the asynchronous input handler 350 may include operations that the asynchronous input handler 350 may direct a corresponding system to perform. The asynchronous input handler 350 may be configured to perform a series of operations with respect to the state estimator system 300 and/or information obtained by the state estimator system 300.

In some embodiments, the asynchronous input handler 350 may be configured to align the timing of asynchronous input information. For example, input odometry data 324 or input point clouds 322 may be obtained by the state estimator system 300 at a rate of 10 Hz, IMU data 328 may be obtained at a rate of 100 Hz, and GPS data 326 may be obtained at a rate of 1 Hz. Because of the different rates of information generation, not all of the IMU data 328, GPS data 326, input point clouds 322, and/or input odometry data 324 may correspond to one another with respect to the time at which the data is collected. In these and other examples, the asynchronous input handler 350 may align the timing of the asynchronous input information by, for example, determining the time each data point was collected and pairing the data points collected at the same or similar times (e.g., data points collected within 1 millisecond (ms), 5 ms, 10 ms, etc. of one another). Additionally or alternatively, the asynchronous input handler 350 may format the asynchronous input information such that the input information may be presented in the same format.

In these and other embodiments, aligning the input information obtained by the state estimator system 300 may result in outputting odometry data 372 related to the system at a higher frequency than the rate at which the input odometry data is generated. For example, the odometry data obtained by the state estimator system 300 may be generated at a rate of 10 Hz, and the state estimator system 300 may output the odometry data 372 at a rate of 50 Hz. In some embodiments, one or more estimation algorithms, such as an extended Kalman filter 360, a dual-channel extended Kalman filter, etc., may be applied to the asynchronous input information to facilitate generating the output odometry data 372 at a higher frequency than the input odometry data. By aligning the input odometry data with information describing the system that is captured at a higher frequency, such as the IMU data 328, the frequency at which the output odometry data 372 may be generated is increased relative to the input odometry data while potentially still being verified or checked against real sensor data.

Additionally or alternatively, aligning the asynchronous input data may facilitate identifying and determining new parameters related to the system that would otherwise not be captured based on odometry data alone. For example, aligning the input odometry data with the IMU data 328 may facilitate determining an acceleration 374 of the system at the same or a similar frequency as the output odometry data 372 is generated.

In some embodiments, the output odometry data 372 and/or the acceleration 374 of the autonomous vehicle may in part or in total represent the state of the autonomous vehicle, and the state of the autonomous vehicle may be sent to one or more downstream systems 380 for further computation and/or analysis. For example, the downstream systems 380 may include the routing system 108, the prediction system 110, decision system 112, the planning system 114, the control system 116, the drive-by-wire system 118, the visualization system 120, the diagnostics system 122, the simulations system 124, the fleet management system 126, or some combination thereof as described in relation to the autonomous driving system 100 of FIG. 1.

The state estimator system 300 may include a periodic updater 370, which may be configured to update the state of the system output by the state estimator system 300 (e.g., the output odometry data 372 including the pose and/or the twist of the system and/or motion parameters including the speed and/or the acceleration 374 of the system) at a predetermined update interval. In some embodiments, the predetermined update interval at which the state of the system is updated may be set by a user. Additionally or alternatively, a computing system, such as a machine-learning computing system, may set the predetermined update interval based on environmental information (e.g., updating the state of the system more frequently in rainy weather, updating the state of the system less frequently in response to fewer pedestrians and/or vehicles being detected, etc.).

In some embodiments, the state estimator system 300 may be configured to extrapolate and/or interpolate data received asynchronously to determine intermediate states of the system using fewer than all of the input information. For example, the state estimator system 300 may determine an initial state of the system using the IMU data 328 and the point cloud input 322. The state estimator system 300 may then use only IMU data 328 to estimate a next state of the system and verify that the next state is within a threshold of an expected variance from the initial state (e.g., the state estimator system 300 may query whether or not the estimated state is within a threshold distance/change in orientation from the initial state based on the previously measured acceleration, direction of movement, orientation, etc.). This process of extrapolating states based on only fresh IMU data 328 and the previously obtained input point clouds 322 may be repeated for a number of states. When fresh LiDAR input data 322 is obtained, the state of the system may be trued up to the fresh LiDAR data 322. In these and other embodiments, the state estimator system 300 may generate estimated states of the system at a higher frequency than the input point clouds 322 is obtained (e.g., at 50 Hz instead of 10 Hz), while still being corrected or recalibrated upon the receipt of fresh LiDAR data 322.

While input point clouds 322 and IMU data 328 are used in this example, it will be appreciated that other input data is also contemplated to be used in the same or similar manner. For example, radar data and/or GPS data 326, as received, may be used to verify and/or inform the state of the system as estimated by the state estimator system 300. As another example, wheel odometry data and/or drive-by-wire (DBW) data corresponding to control operations of a vehicle by a user may be used to provide additional data to increase the accuracy of a given state when such data is available.

Modifications, additions, or omissions may be made to the state estimator system 300 without departing from the scope of the present disclosure. For example, the designations of different elements in the manner described is meant to help explain concepts described herein and is not limiting. For instance, in some embodiments, the input odometry data, the IMU data 328, the GPS data 326, the output odometry data 372, and/or the output acceleration data 374 are delineated in the specific manner described to help with explaining concepts described herein but such delineation is not meant to be limiting. Further, the state estimator system 300 may include any number of other elements or may be implemented within other systems or contexts than those described.

Figure 4:
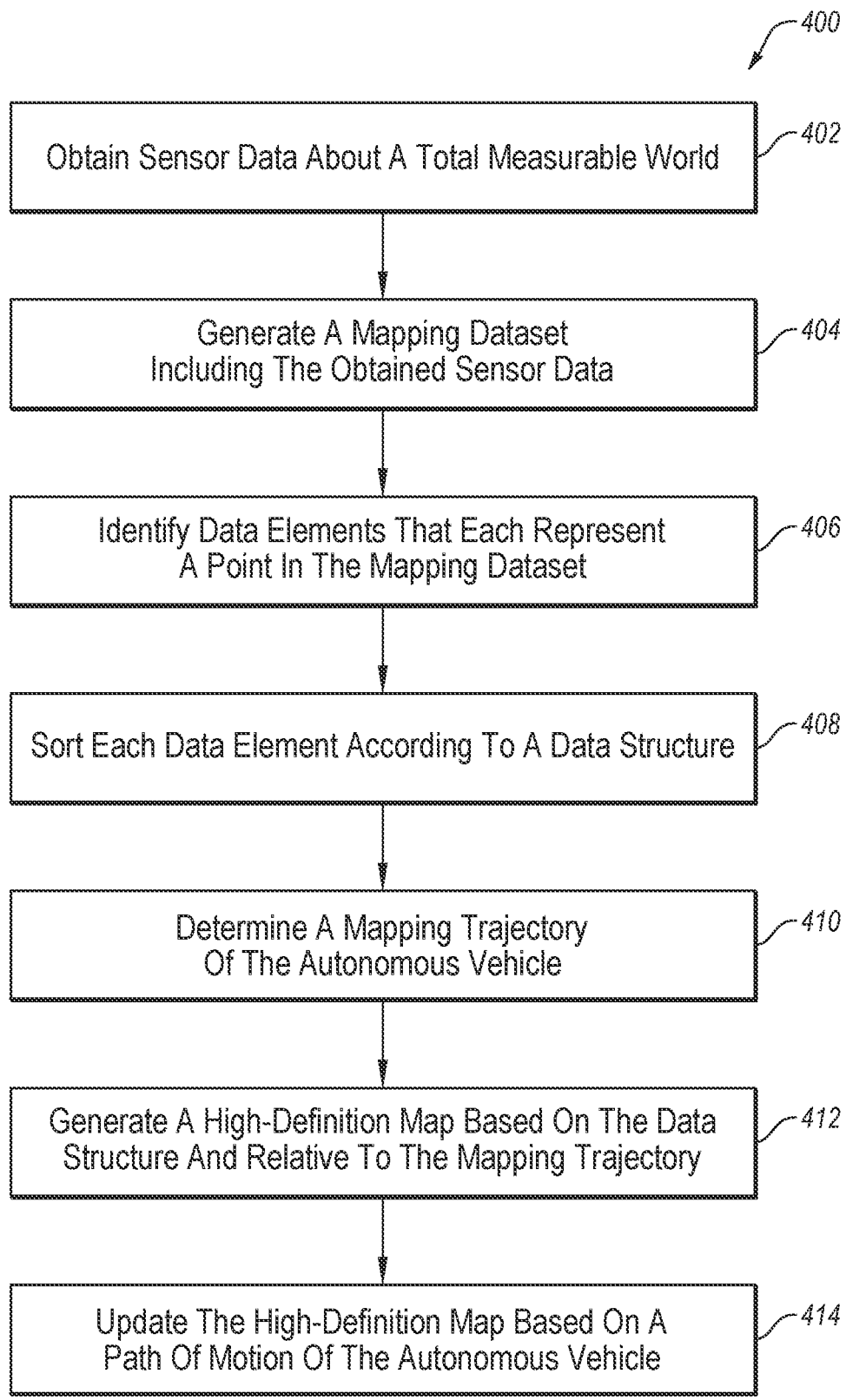
FIG. 4 is a flowchart of an example method of generating the high-definition feature map according at least one embodiment of the to the present disclosure.

FIG. 4 is a flowchart of an example method 400 of generating a high-definition map according to at least one embodiment of the present disclosure. The method 400 may be performed by any suitable system, apparatus, or device.

For example, the high-definition mapping system 200, the localization and mapping engine 230, the surface-feature extraction module 240, the edge-feature extraction module 245, the mapping trajectory 235, the point cloud map aggregator 250, the map writer 260, and/or the point cloud map 270 of FIG. 2 may perform one or more operations associated with the method 400. Although illustrated with discrete blocks, the steps and operations associated with one or more of the blocks of the method 400 may be divided into additional blocks, combined into fewer blocks, or eliminated, depending on the particular implementation.

The method 400 may begin at block 402, where sensor data about a total measurable world around an autonomous vehicle may be obtained. In some embodiments, the sensor data may be captured by one or more sensor units co-located with the autonomous vehicle. For example, the sensor units may be positioned inside the autonomous vehicle and oriented towards the surroundings of the autonomous vehicle, on an external surface of the autonomous vehicle, or some combination thereof. In some embodiments, the sensor data may include information captured by two or more different types of sensors, which may be configured to capture sensor data at different frequencies. For example, a given first sensor may be a LiDAR sensor that captures LiDAR data at a first frequency between 5 Hz and 20 Hz, and a second give sensor may be a motion sensor that captures IMU data at a second frequency between 30 Hz and 100 Hz.

At block 404, a mapping dataset that describes physical properties of the total measurable world around the autonomous vehicle may be generated. In some embodiments, the mapping dataset may be the same as or similar to the mapping dataset 220 as described in relation to FIG. 2. In these and other embodiments, the mapping dataset may include a frequency-agnostic representation of the total measurable world in which the sensor data, which may be captured at varying frequencies of data capture, and may be representative of the total measurable world at a standardized frequency.

At block 406, data elements that represent individual points in the mapping dataset may be identified. In some embodiments, the data elements may represent granular points included in the mapping dataset in which a total collection of the data elements represents the total measurable world as represented by the sensor data captured by the sensors associated with the autonomous vehicle. For example, the data elements may include points in a LiDAR point cloud, pixels in an image, among others.

At block 408, the data elements may be sorted according to a structural data categorization in which the structural data categorization is a template for determining features included in the total measurable world. For example, the structural data categorization may be based on intensity values of the data elements, proximity between the data elements points, degree of changes to the data elements between two or more scans of the total measurable world, color values of the data elements, or some combination thereof. As an additional or alternative example, the structural data categorization may involve surface features that represent surfaces of objects in the total measurable world and edge features that represent edges of the objects in the total measurable world.

At block 410, a mapping trajectory of the autonomous vehicle may be determined in which the mapping trajectory describes a localization of the autonomous vehicle and/or a path of motion of the autonomous vehicle. In some embodiments, the mapping trajectory may be the same as or similar to the mapping trajectory 235 as described in relation to FIG.

2. The mapping trajectory may facilitate an understanding by the AV or other associated computing systems of which areas of a map are to be generated, updated, or otherwise built out.

At block 412, the high-definition map may be generated based on the structural data categorization and the mapping trajectory. In some embodiments, the high-definition map may be developed over multiple frames of sensor scans that result in point cloud maps, such as the point cloud maps 270 as described in relation to FIG. 2, with each frame of the sensor scans providing information regarding changes in the mapping trajectory and/or new or modified data elements corresponding to the structural data categorization.

At block 414, the high-definition map may be updated based on the path of motion of the autonomous vehicle. For example, the path of motion of the autonomous vehicle may indicate that the autonomous vehicle appears to be changing directions from a first direction of travel to a second direction of travel. In this and other examples, the high-definition map may position some new data elements captured by the sensors associated with the autonomous vehicle in the second direction in response to the change in the path of motion. In some embodiments, the block 414 may represent a previously established high-definition map being updated in various regions through which the vehicle is traveling.

Modifications, additions, or omissions may be made to the method 400 without departing from the scope of the disclosure. For example, the designations of different elements in the manner described is meant to help explain concepts described herein and is not limiting. Further, the method 400 may include any number of other elements or may be implemented within other systems or contexts than those described.

Figure 5:
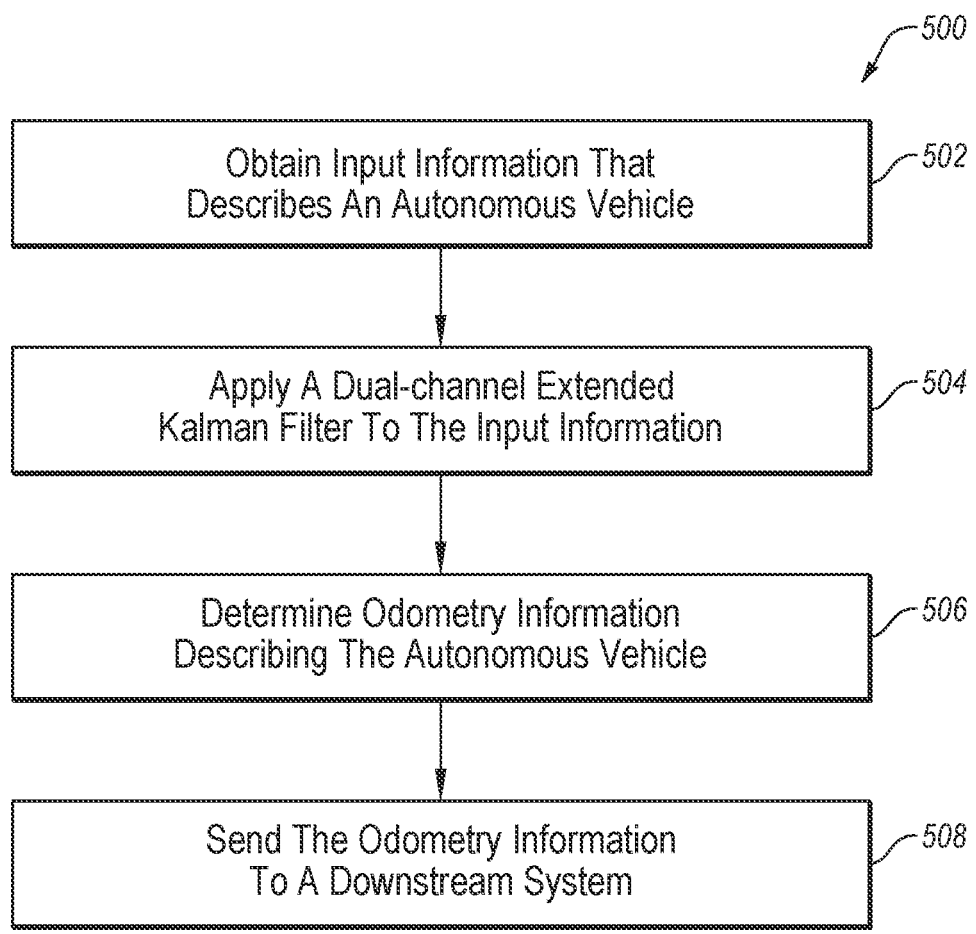
FIG. 5 is a flowchart of an example method of performing state estimation for an autonomous vehicle according at least one embodiment of the to the present disclosure.

FIG. 5 is a flowchart of an example method 500 of performing state estimation for an autonomous vehicle according at least one embodiment of the to the present disclosure. The method 500 may be performed by any suitable system, apparatus, or device. For example, the state estimation system 300, the LiDAR odometry system 330, the local high-definition map 340, the asynchronous input handler 350, the Extended Kalman Filter 360, and/or the periodic updater 370 of FIG. 3 may perform one or more operations associated with the method 500. Although illustrated with discrete blocks, the steps and operations associated with one or more of the blocks of the method 500 may be divided into additional blocks, combined into fewer blocks, or eliminated, depending on the particular implementation.

The method 500 may begin at block 502, where input information that describes an autonomous vehicle may be obtained. In some embodiments, the input information may include sensor data captured by sensors associated with the autonomous vehicle in which the sensors and sensor data are the same as or similar to the sensor data as described in relation to the method 400 of FIG. 4. In these and other embodiments, the input information may include two or more data types with one or more of the data types including asynchronous data-capture frequencies, or stated another way, of the input information, at least two the sensors include data capture which occurs at different frequencies.

At block 504, asynchronous sensor data may be aligned to a consistent point in time. For example, a dual-channel extended Kalman filter may be applied to the input information to align the input information. In some embodiments, the dual-channel extended Kalman filter may be the same as or a similar implementation of the Extended Kalman Filter 360 as described in relation to FIG. 3. The dual-channel extended Kalman filter may be configured to align the input information with respect to the input information's data-capture frequencies so that rather than having asynchronous data-capture frequencies, the input information is aligned in timing.

At block 506, odometry information indicating a state of the autonomous vehicle may be determined based on the aligned input information. In some embodiments, the state of the autonomous vehicle may describe a position within a coordinate space, an acceleration, a velocity, an orientation, a pose, a twist of the autonomous vehicle, or some combination thereof. One example of determining the odometry information associated with the state of the autonomous vehicle includes the steps of a method 600 as described in relation to FIG. 6.

At block 508, the odometry information and/or the state of the autonomous vehicle may be sent to a downstream system. In some embodiments, the downstream system may include the routing system 108, the prediction system 110, decision system 112, the planning system 114, the control system 116, the drive-by-wire system 118, the visualization system 120, the diagnostics system 122, the simulations system 124, the fleet management system 126, or some combination thereof as described in relation to the autonomous driving system 100 of FIG. 1.

Modifications, additions, or omissions may be made to the method 500 without departing from the scope of the disclosure. For example, the designations of different elements in the manner described is meant to help explain concepts described herein and is not limiting. Further, the method 500 may include any number of other elements or may be implemented within other systems or contexts than those described.

Figure 6:
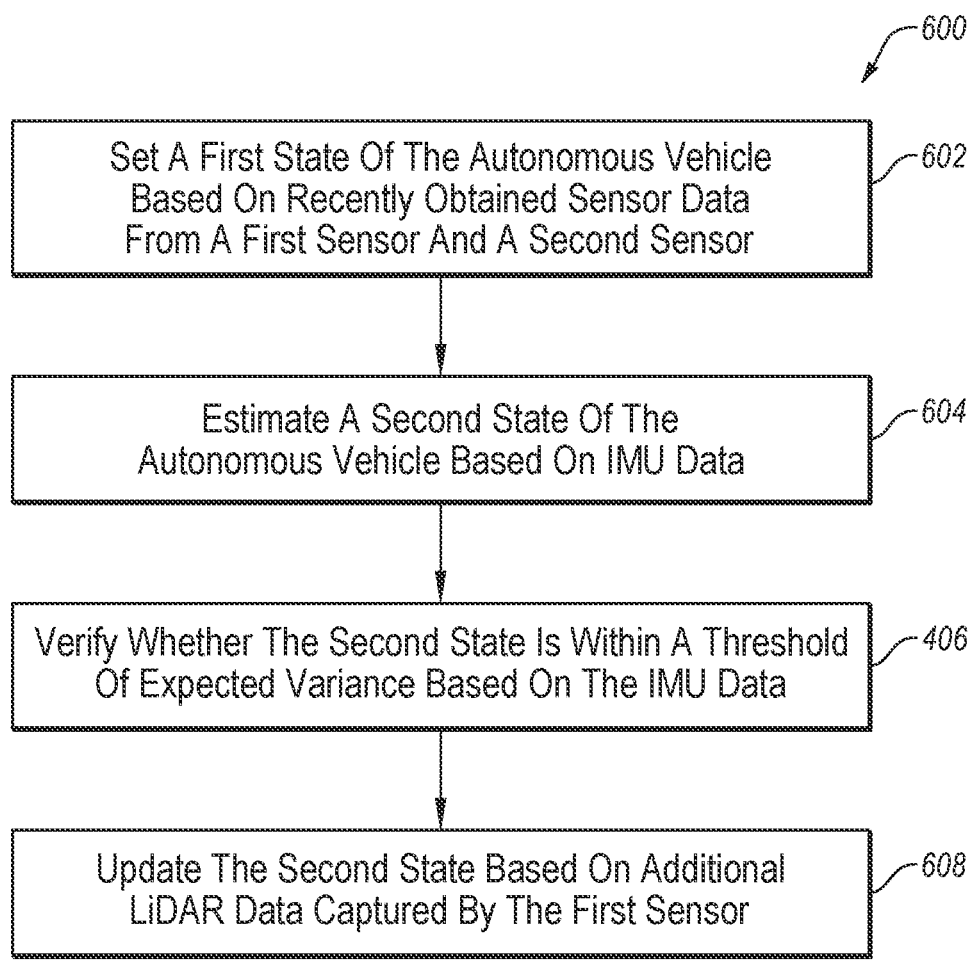
FIG. 6 is a flowchart of an example method of determining an intermediate state of an autonomous vehicle in relation to estimating the state of the autonomous vehicle according to at least one embodiment of the present disclosure.

FIG. 6 is a flowchart of an example method 600 of determining an intermediate state of an autonomous vehicle in relation to estimating the state of the autonomous vehicle according to at least one embodiment of the present disclosure. The method 600 may be performed by any suitable system, apparatus, or device. For example, the state estimation system 300, the LiDAR odometry system 330, the local high-definition map 340, the asynchronous input handler 350, the Extended Kalman Filter 360, and/or the periodic updater 370 of FIG. 3 may perform one or more operations associated with the method 600. Although illustrated with discrete blocks, the steps and operations associated with one or more of the blocks of the method 600 may be divided into additional blocks, combined into fewer blocks, or eliminated, depending on the particular implementation.

The method 600 may begin at block 602, where setting a first state of the autonomous vehicle based on recently obtained sensor data from a first sensor and a second sensor in which the first sensor and the second sensor are different sensor types and capture sensor data at different frequencies. In some embodiments, the first sensor may include a LiDAR sensor that captures LiDAR data at a frequency between 5 Hz and 20 Hz, while the second sensor is a motion sensor that captures IMU data at a frequency between 40 Hz and 100 Hz. In these and other embodiments, the second sensor may capture sensor data more quickly or more frequently than the first sensor. As such, the intermediate state of the autonomous vehicle may use the more frequently captured sensor data as a basis and verify the information included in the basis using the less frequently captured sensor data.

At block 604, a second state of the autonomous vehicle may be estimated based on the motion data associated with the autonomous vehicle that are captured before capturing additional LiDAR data. In some embodiments, the second state of the autonomous vehicle may represent the intermediate state of the autonomous vehicle. The second state may be considered intermediate because the motion data captured between frames of LiDAR data may indicate that the state of the autonomous vehicle has changed since data capture associated with the first state, but additional LiDAR data is not yet available to verify the changes from the first state. The intermediate state may provide an estimation of the autonomous vehicle's new state during the interim, which may be more accurate during situations such as high-speed operation of the autonomous vehicle. In some embodiments the estimation may operate according to a motion model, a predicted trajectory of the vehicle, or any other approach that accounts for the previous state or states of the vehicle and estimates the next state.

At block 606, whether the second state is within a threshold of expected variance from the first state may be verified based on the motion data. Given the first, known state of the autonomous vehicle, a user and/or a computer system may determine that the autonomous vehicle may physically travel a given distance and in a given direction corresponding to the motion data captured during the interim. In some embodiments, the threshold of expected variance may be set according to the possible range of motion of the autonomous vehicle as determined by the computer system and/or by the user. For example, based on a motion model, predicted trajectory, or other approach, the autonomous vehicle may be predicted to move forward one meter at the time of the second state, and a 30%, 50%, etc. variance from that value may be acceptable (e.g., if 1 meter is expected, and a 50% variance is used as the threshold, between 0.5 meters and 1.5 meters as indicated by the motion data may be considered within the threshold of expected variance).

At block 608, the intermediate state of the autonomous vehicle may be updated responsive to obtaining additional LiDAR data. In some embodiments, the additional LiDAR data may be used to update the intermediate state of the autonomous vehicle to determine a second state. The second state may be the same as or similar to the first state and/or the intermediate state in terms of the types of information provided by the second state. Additionally or alternatively, the second state may or may not include different, the same, or similar quantitative parameters with respect to the first state and/or the intermediate state. In some embodiments, any of the first state, the intermediate state, and/or the second state may include a quality score or other indicator based on which data is used to create the given state and what aspects of the state are estimated. For example, the first state based on LiDAR and other data may have a high quality score, the intermediate state may have an intermediate quality score when the estimation is consistent with motion data such as IMU data, and the second state may include a high quality score when based on additional LiDAR data.

Modifications, additions, or omissions may be made to the method 600 without departing from the scope of the disclosure. For example, the designations of different elements in the manner described is meant to help explain concepts described herein and is not limiting. Further, the method 600 may include any number of other elements or may be implemented within other systems or contexts than those described.

Figure 7:
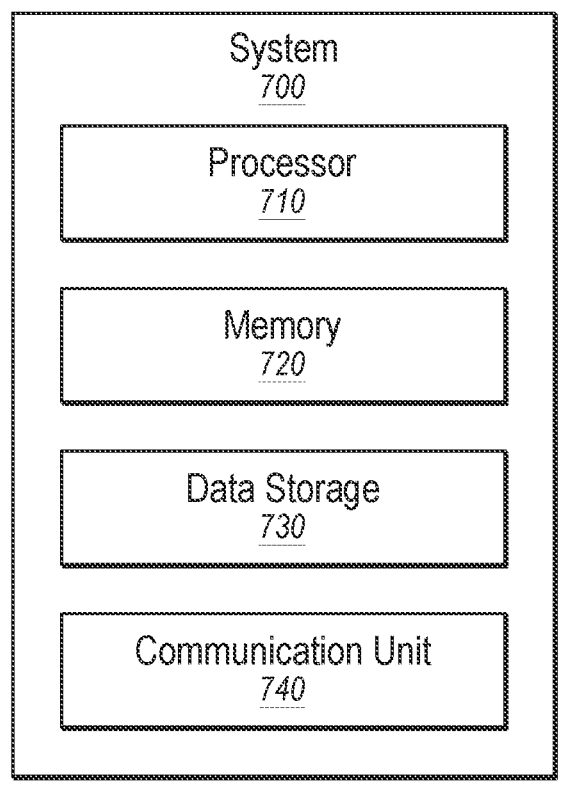
FIG. 7 is an example computing system.

FIG. 7 illustrates an example computing system 700, according to at least one embodiment described in the present disclosure. The computing system 700 may include a processor 710, a memory 720, a data storage 730, and/or a communication unit 740, which all may be communicatively coupled. Any or all of the high-definition mapping system 200 of FIG. 2 and/or of the state estimation system 300 of FIG. 3 may be implemented as a computing system consistent with the computing system 700, including the mapping dataset 220, the localization and mapping engine 230, the surface-feature extraction module 240, the edge-feature extraction module 245, the mapping trajectory 235, the point cloud map aggregator 250, the map writer 260, the point cloud map 270, the LiDAR odometry system 330, the local high-definition map 340, the asynchronous input handler 350, the Extended Kalman Filter 360, and/or the periodic updater 370.

Generally, the processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 7, it is understood that the processor 710 may include any number of processors distributed across any number of network or physical locations that are configured to perform individually or collectively any number of operations described in the present disclosure. In some embodiments, the processor 710 may interpret and/or execute program instructions and/or process data stored in the memory 720, the data storage 730, or the memory 720 and the data storage 730. In some embodiments, the processor 710 may fetch program instructions from the data storage 730 and load the program instructions into the memory 720.

After the program instructions are loaded into the memory 720, the processor 710 may execute the program instructions, such as instructions to perform operations associated with the mapping dataset 220, the localization and mapping engine 230, the surface-feature extraction module 240, the edge-feature extraction module 245, the mapping trajectory 235, the point cloud map aggregator 250, the map writer 260, the point cloud map 270, the LiDAR odometry system 330, the local high-definition map 340, the asynchronous input handler 350, the Extended Kalman Filter 360, and/or the periodic updater 370.

The memory 720 and the data storage 730 may include computer-readable storage media or one or more computer-readable storage mediums for having computer-executable instructions stored thereon. Such computer-readable storage media may be any available media that may be accessed by a general-purpose or special-purpose computer, such as the processor 710. For example, the memory 720 and/or the data storage 730 may store the mapping dataset 220, the mapping trajectory 235, the surface features, the edge features, the point cloud map 270, the point cloud input 322, the input odometry data 324, the GPS data 326, the IMU data 328, the output odometry data 372, and/or the acceleration 374. In some embodiments, the computing system 700 may or may not include either of the memory 720 and the data storage 730.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions and which may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 740 may include any component, device, system, or combination thereof that is configured to transmit or receive information over a network. In some embodiments, the communication unit 740 may communicate with other devices at other locations, the same location, or even other components within the same system. For example, the communication unit 740 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 740 may permit data to be exchanged with a network and/or any other devices or systems described in the present disclosure. For example, the communication unit 740 may allow the system 700 to communicate with other systems, such as computing devices and/or other networks.

One skilled in the art, after reviewing this disclosure, may recognize that modifications, additions, or omissions may be made to the system 700 without departing from the scope of the present disclosure. For example, the system 700 may include more or fewer components than those explicitly illustrated and described.

The embodiments described in the present disclosure may include the use of a special purpose or general-purpose computer including various computer hardware or software modules. Further, embodiments described in the present disclosure may be implemented using computer-readable media for having computer-executable instructions stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method comprising:

obtaining first sensor data at a first frequency from a first sensor and second sensor data at a second frequency from a second sensor located within an autonomous vehicle (AV), the first sensor data and the second sensor data being representative of an environment around the AV and comprises a plurality of data points, wherein the second frequency is higher than the first frequency;

averaging data values of two or more of the data points included in the second sensor data to cause a number of the plurality of data points included in the second sensor data to be equal to a number of the plurality of data points included in the first sensor data to generate a set of sensor data;

generating a mapping dataset based on the set of sensor data;

identifying a plurality of data elements in the mapping dataset in which each data element of the plurality of data elements corresponds to at least one data point of the plurality of data points;

assigning a first portion of the plurality of data elements to a first structural data categorization and a second portion of the plurality of data elements to a second structural data categorization, wherein:

the data elements assigned to the first structural data categorization correspond to surface features of objects in the environment; and the data elements assigned to the second structural data categorization correspond to edge features of the objects in the environment and are assigned based on a contrast in intensity of properties of proximate data points of the sensor data along a continuous line;

identifying the objects in the environment based on boundaries delineated by the edge features and positioning of the surface features relative to the edge features;

determining a mapping trajectory of the AV, the mapping trajectory describing a localization and a path of motion of the AV;
generating a high-definition map based on the identified objects and relative to the mapping trajectory of the AV;
updating the high-definition map based on the path of motion of the AV; and
controlling the AV such that the AV navigates the environment based on the updated high-definition map.

2. The method of claim 1, wherein:
the first sensor comprises a Light Detection and Ranging (LiDAR) sensor and the second sensor comprises an inertial measurement unit (IMU) sensor;
the first frequency is between 5 Hertz (Hz) and 20 Hz; and
the second frequency is between 30 Hz and 100 Hz.

3. The method of claim 1, wherein the averaging the data values of the two or more of the data points included in the second sensor data to cause the number of the plurality of data points included in the second sensor data to be equal to the number of the plurality of data points included in the first sensor data to generate a set of sensor data comprises
pairing the data points included in the first sensor data with the averaged data points included in the second sensor data corresponding to same time points to generate the set of sensor data at a third frequency.

4. The method of claim 1, wherein the first structural data categorization or the second structural data categorization correspond to at least one of: intensity values of the data elements, proximity between data elements, degree of changes to the data elements between two or more scans of the environment, or color values of the data elements.

5. An autonomous vehicle (AV) system configured to perform driving operations, the AV system comprising:
one or more processors; and
one or more non-transitory computer-readable storage media configured to store instructions that, in response to being executed, cause the AV system to perform operations, the operations comprising:
obtaining first sensor data and second sensor data from a sensor unit co-located within the AV, the first sensor data and the second sensor data being representative of an environment around the AV and wherein the first sensor data and second sensor data both comprise a plurality of data points;
synthesizing the plurality of data points of the second sensor data to reduce a number of the data points included in the second sensor data to be equal to a number of the data points included in the first sensor data;
pairing the data points included in the first sensor data with the synthesized data points included in the second sensor data corresponding to same time points to generate a set of sensor data, wherein the data points included in the first sensor data are paired with the synthesized data points included in the second sensor data that correspond to same time points as the data points included in the first sensor data;
generating a mapping dataset based on the set of sensor data;
identifying a plurality of data elements in the mapping dataset in which each data element of the plurality of data elements corresponds to at least one data point of the plurality of data points;
assigning a first portion of the plurality of data elements a first structural data categorization and a second portion of the plurality of data elements to a second structural data categorization, wherein:
the data elements assigned to the first structural data categorization correspond to surface features of objects in the environment; and
the data elements assigned to the second structural data categorization correspond to edge features of the objects in the environment and are assigned based on a contrast in intensity of properties of proximate data points of the sensor data along a continuous line;
identifying the objects in the environment based on boundaries delineated by the edge features and positioning of the surface features relative to the edge features;
determining a mapping trajectory of the AV, the mapping trajectory describing a localization and a path of motion of the AV;
generating a high-definition map based on the identified objects and relative to the mapping trajectory of the AV;
identifying a region of the high-definition map corresponding to the path of motion of the AV based on the mapping trajectory;
updating the region of the high-definition map corresponding to the path of motion of the AV to generate an updated high-definition map; and
controlling the AV such that the AV navigates the environment based on the updated high-definition map.

6. The AV system of claim 5, wherein the operations further comprise:
applying a dual-channel extended Kalman filter to the sensor data to align the sensor data;
determining odometry information describing a state of the AV based on the aligned sensor data; and
sending the odometry information describing the state of the AV to a downstream computer system associated with the AV.

7. The AV system of claim 6, wherein:
the second sensor data comprises Light Detection and Ranging (LiDAR) data generated by a LiDAR sensor of the sensor unit at a frequency between 5 Hertz (Hz) and 20 Hz; and
the first sensor data comprises Inertial Measurement Unit (IMU) data generated by a motion sensor of the sensor unit at a frequency between 40 Hz and 100 Hz.

8. The AV system of claim 7, wherein the determining the odometry information comprises:
setting a first state of the AV based on the LiDAR data and the IMU data at a first time point;
estimating a second state of the AV based on a portion of the IMU data generated by the motion sensor before additional LiDAR data is generated by the LiDAR sensor at a second time point that is subsequent to the first time point;
verifying whether the second state is within a threshold of expected variance from the first state based on the IMU data;
obtaining the additional LiDAR data from the LiDAR sensor at a third time point subsequent to the second time point; and
determining a third state of the AV by updating the estimated second state based on the additional LiDAR data.

* * * * *